United States Patent [19]

Rispoli et al.

[11] Patent Number: 4,496,601

[45] Date of Patent: Jan. 29, 1985

[54] PROCESSING FOR PREPARING A COATING MIX CONTAINING A FRIED COMPONENT

[75] Inventors: Joseph M. Rispoli, Massepequa Park; Morris A. Rogers, Mt. Vernon; Haig H. Sergenian, Yonkers, all of N.Y.; John S. Swartley, Westport; Harry Topalian, Weston, both of Conn.

[73] Assignee: General Foods Corporation, White Plains, N.Y.

[21] Appl. No.: 439,445

[22] Filed: Nov. 5, 1982

[51] Int. Cl.³ .......................................... A21D 10/00
[52] U.S. Cl. ................................. 426/554; 426/555; 426/439; 426/652; 426/289
[58] Field of Search ............... 426/554, 555, 289, 291, 426/293, 296, 439, 652

[56] References Cited

U.S. PATENT DOCUMENTS

| | | | |
|---|---|---|---|
| 3,486,904 | 12/1969 | Ziegler | 426/438 |
| 4,068,009 | 1/1978 | Rispoli et al. | 426/552 |
| 4,199,603 | 4/1980 | Sortwell | 426/96 |
| 4,208,442 | 6/1980 | Evans | 426/96 |

*Primary Examiner*—Raymond Jones
*Assistant Examiner*—Elizabeth A. King
*Attorney, Agent, or Firm*—Thomas R. Savoie; Thomas A. Marcoux; Daniel J. Donovan

[57] ABSTRACT

Droplets of an aqueous, flour-based batter are deep fat fried in vegetable oil. These particles are used as a component of a coating mix which is designed to impart a fried taste, texture and appearance to baked foodstuffs.

12 Claims, No Drawings

PROCESSING FOR PREPARING A COATING MIX CONTAINING A FRIED COMPONENT

TECHNICAL FIELD

This invention relates to edible food coatings and more particularly is directed to a food coating to be applied to the food prior to baking for the purpose of imparting a fat fried appearance, texture and especially taste to the baked food.

Many foods such as poultry, meat, fish and vegetables are breaded with a light coating of flour and/or breadcrumbs which on frying in oil develops into a characteristic crispy, brown-colored coating.

However, the messiness involved with the preparation of fried foods, the ever-present danger of spattering oil, and the unfavorable dietary aspects associated with fried foods have led recently to the development of coatings which attempt to impart a fried appearance to a foodstuff which is baked and yet retain the appealing color, taste, and texture associated with fried foods.

BACKGROUND ART

Several U.S. patents, including No. 4,260,637 to Rispoli et al.; No. 4,218,485 to Lee et al.; No. 4,208,442 to Evans et al.; No. 4,068,009 to Rispoli et al.; No. 3,952,110 to Knight et al.; No. 3,852,501 to Fazzina et al.; No. 3,843,827 to Lee et al. and No. 3,586,512 to Mancuso et al., disclose dry coating formulations which are useful to provide a fried appearance, taste and texture to baked foodstuffs such as chicken. While each of these patents represents an advance in the art, there remain opportunities to further improve upon the characteristics of the coated and baked comestible so as to render one or more of these characteristics more similar to the character of deep fat fried comestibles.

U.S. Pat. No. 3,486,904 discloses the use of a prefried cereal breading material which is applied directly onto batter coated foodstuffs which are then frozen, this technique being an alternative to deep fat frying the batter-coated comestible prior to freezing. Copending and commonly-assigned application to Coleman and Mills (Ser. No. 438,097) discloses the use of deep fat fried farinaceous particles in a coating composition which is applied to foodstuffs prior to baking.

DISCLOSURE OF THE INVENTION

Dry coating mixes designed to impart a fried appearance, taste and texture to baked foodstuffs are improved by the incorporation of particles of a deep fat fried, farinaceous material. The resulting composition may be applied to such foodstuff categories as poultry, meat, fish and vegetables prior to baking in order to impart a simulated fried appearance, taste and texture to the foodstuff. The foodstuffs contemplated for use in this invention are uncooked, preferably fresh (i.e. non-frozen), foods which are coated with the composition of this invention immediately prior to baking. Examples of the foodstuffs which are suitable for use in this invention are chicken pieces and cutlets, pork chops and cutlets, fish fillets and eggplant strips.

The fried farinaceous particles of this invention are produced by rapidly cooking particles of a liquid batter in a hot oil and subsequently removing the particles from the oil and draining excess oil from the particles. Frying of the batter particles will normally be conducted in a vegetable oil or shortening bath at a temperature of from about 160° C. (320° F.) to 226.7° C. (440° F.) for a period of time of from 30 seconds to about 6 minutes.

The batter may be added to the hot oil in a dropwise manner, in a thin stream or in any other fashion which will result in small diameter masses of the liquid batter being formed and rapidly cooked in the hot oil. One preferred method is to pour the batter through a sieve held in place about 0.25 to 0.6 meters above the surface of the oil.

In order to obtain the desired rapid cooking and resultant desireable texture in the fried particles, the batter masses should have a diameter of from about 1.0 to 2.0 mm., which is roughly equivalent to U.S. Standard Sieve Sizes of from 18 mesh to 10 mesh. After frying to the desired extent the particles are removed from the hot oil and excess oil is drained and/or removed from the surface of the particles. Contact with an adsorbent material or blowing a stream of air past the particles are two of many possible techniques useful to remove excess oil from the surface of the fried particles. If any of the resulting fried particles are excessive in size, such as would result if droplets of batter were to merge either above or in the hot oil or if the fried or partially-fried particles were to agglomerate either after or during frying, then it would be necessary to subdivide these large particles, such as by pushing them through a screen having suitably sized openings.

The liquid batter for use in this invention may be any conventional flour-based, aqueous batter, such as those well-known to persons skilled in the art. Typically such batters will contain on a weight basis from 50 to 85% water, from 5 to 30% flour, and from 5 to 20% starch. Desireably the batter will also contain from 0.1 to 1% of gum, from 1 to 10% of fat or oil and, if warranted, an effective amount of preservative agent. The batter can contain a chemical and/or heat-activated leavening agent if a more porous texture is desired for the fried particles. Natural spices and/or flavoring agents could also be included in the batter. In commercial operation it may be desirable to utilize a batter which is freezer-stable for extended periods of time and bacteriologically-stable, for several days at refrigerated conditions. Such a batter is more fully described in commonly-assigned Ser. No. 248,381 to Lee et al., which is hereby incorporated by reference.

The fried farinaceous particles of this invention will be combined with other functional ingredients so as to produce a coating composition containing from 10% to 50%, preferably from 15% to 35% by weight of the fried particles. The remaining ingredients which may include any combination of flour, bread crumbs, cereal fines, protein-film formers, modified cornstarches, dextrins, binding agents, powdered fat, flavors, spices, colors and the like. These ingredients may constitute a preexisting coating mix such as those described in U.S. Pat. Nos. 4,260,637, 4,218,485, 4,408,442, 3,857,501 and 3,843,827 (all of which are hereby specifically incorporated by reference) or may be specially formulated for combination with the prefried particles of this invention. The incorporation of unfried coating ingredients with the fried farinaceous particles has been found to provide increased stability towards oxidative rancidity of the fried particles.

The coating composition will typically contain from 17% to 35% by weight of bread crumbs, preferably Japanese bread crumbs, such as described in U.S. Pat. No. 4,068,009 to Rispoli et al., and from 10% to 30% by weight of starch-containing materials such as flour, cereal fines, and the like to facilitate binding of the coating composition onto the foodstuff. Additional ingredients such as from 1.5% to 30% of film forming agents such as low (less than 15) D.E. dextrins, and/or modified cornstarches, and/or film-forming proteins such as gelatin, sodium caseinate, soy protein isolate, egg albumin and the like, and up to 5%, preferably from 0.6% to 3.5% by weight natural spices, may also be employed.

The deep fat fried particles of this invention will be comminuted and/or screened to obtain a particle fraction which will blend well with the other particulate ingredients. The fried particles will typically be at least 40% by weight through a U.S. standard screen size No. 14, with less than about 5% by weight of the particles being retained on a U.S. Standard screen No. 5. The fried particles will have a moisture content of less than about 5% by weight and a fat and/or oil content of from about 12% to 30%. The fat and moisture content of the product can be readily adjusted not only by selection of the initial dough or batter formulation but also by controlling the time and temperature of the frying operation and insertion of an optional drying step, either before or after comminuting the fried farinaceous material.

The coating compositions of this invention which contain the pre-fried, particulate, farinaceous material is designed for direct application to batter-coated or moistened foodstuffs immediately prior to baking in an oven. The foodstuff may be moistened with water or milk or coated with a suitable batter such as egg; egg and water; egg and milk; flour, egg and milk; flour and water; flour and milk; and the like. The foodstuff can be coated with batter by dipping, spraying, immersing, etc. The foodstuff may be dusted with flour before being batter coated in order to obtain a more coherent coating.

The coating composition can be applied to the moistened or batter coated foodstuff by any common means, such as by shaking the coating composition and the foodstuff together in a closed bag, rolling the foodstuff in the coating composition or pressing the coating composition firmly onto the surfaces of the foodstuff. After this coating step has been completed the foodstuff is promptly, without an intervening storage or freezing step and typically within about 30 minutes, baked in an oven until done.

Baking may be done in a conventional thermostatically-controlled oven, in a microwave oven or by using any combination thereof. Generally, the temperature employed in a conventional oven will be within the range of about 325° to 450° F. (162.8° to 232.2° C.). In order to prevent possible sticking of the coated comestible to the baking surface the surface may be coated wtih a minimal amount of oil.

When the comestible is coated and cooked in accordance with this invention the resultant foodstuff possess a coherent, crisp coating which has a deep fat fried color, flavor and appearance without an excessive oily taste or character. The moistness and tenderness of the product is also highly rated.

PREFERRED METHODS FOR INVENTION

The preferred methods of carrying out this invention are best given by way of the following examples which however are not to be regarded as limiting the scope of invention. The percentages and ratios expressed in the examples are on a weight basis.

EXAMPLE I

An aqueous batter was prepared having the following formulation:

| Ingredient | % |
| --- | --- |
| Water | 57.42 |
| Standard Wheat Flour | 25.13 |
| Modified Corn Starches | 6.81 |
| Vegetable Shortening | 5.79 |
| Salt | 2.72 |
| Monosodium Glutamate | 1.17 |
| Lecithin | 0.34 |
| Hydroxypropyl Methylcellulose | 0.27 |
| Spices | 0.35 |

The above batter was poured through a No. 14 U.S.S. Screen which was suspended about 0.3 meters above a fryer containing 176.7° C. (350° F.) vegetable oil. Droplets of the fried batter were turned over at 3 minutes and removed from the fat at about 5.25 minutes. The particles were drained of excess oil by being placed between paper towels with a weight on top. Large particles were broken-up by hand and then these particles were shaken in a plastic bag together with several paper towels to further remove oil. The fried particles were then blended at a 40% level with a dry coating mix with comprises a farinaceous component containing bread crumbs and a flour and a binding component containing a starch and a dextrin.

Chicken pieces were dipped in an egg and water mixture and the above described coating formulation was pressed onto the surface of the pieces. The coated pieces were placed on a baking tray containing two tablespoons of oil and were baked at 218.3° C. (425° F.) for 25 minutes, then turned and baked for another 25 minutes. The baked product had an excellent fried flavor, texture and appearance.

Having thus described the invention, what is claimed is:

1. A process for preparing a dry coating mix which is effective to impart the texture, taste and appearance of deep fat fried foods to baked foodstuffs comprising the steps of:
    (a) forming an aqueous, flour-based batter containing from 50 to 80% by weight of water, from 5 to 30% by weight of flour and from 5 to 20% by weight of starch;
    (b) forming the batter into particles having a diameter of from about 1.0 to 2.0 mm;
    (c) frying said particles in a vegetable oil having a temperature of from about 320° to 440° F.;
    (d) removing the fried particles from the oil and removing excess oil from the surface of the particles;
    (e) blending the fried particles with other coating ingredients at a level of from 10 to 50% by weight of the mix.

2. The process according to claim 1 wherein the batter is formed into particles by processing the liquid batter through a sieve.

3. The process of claim 1 wherein excess oil is removed from the fried particles by means of an air stream blowing past the particles.

4. The process of claim 1 wherein the batter contains from 0.1 to 1% by weight of gum.

5. The process of claim 1 wherein the batter contains from 1 to 10% of fat or oil.

6. The process of claim 1 wherein the batter contains leavening agent.

7. The process of claim 1 wherein the coating mix contains from 15 to 35% by weight of the fried particles.

8. The process of claim 1 wherein the coating mix contains from 17 to 35% by weight of bread crumbs.

9. The process of claim 8 wherein the coating mix contains from 10 to 30% by weight of starch-containing material.

10. The process of claim 9 wherein the coating mix contains from 1.5 to 30% by weight of film forming agents.

11. The process of claim 8 wherein the fried particles have a particle size distribution of at least 40% by weight through a U.S.S. No. 14 sieve with less than 5% by weight being retained on a U.S.S. No. 5 sieve.

12. The process of claim 11 wherein the fried particles have a moisture content of less than about 5% by weight and a fat and/or oil content of from 12 to 30% by weight.

* * * * *